Dec. 3, 1963   W. E. COLBURN   3,112,748
SURGICAL TUBE

Filed April 4, 1960   2 Sheets-Sheet 1

INVENTOR
WILLIAM E. COLBURN
BY *Robert F. Merrick*

INVENTOR
WILLIAM E. COLBURN
BY *Robert T. Merrick*

United States Patent Office 3,112,748
Patented Dec. 3, 1963

3,112,748
SURGICAL TUBE
William E. Colburn, San Marino, Calif., assignor to Pharmaseal Laboratories, Glendale, Calif., a corporation of California
Filed Apr. 4, 1960, Ser. No. 19,818
12 Claims. (Cl. 128—350)

This invention relates to a surgical tube, and particularly to an inexpensive, double-lumen tube having a retention balloon.

Double-lumen surgical tubes, such as balloon catheters, are usually made of rubber. Such tubes are complicated and expensive to make and therefore usually are used several times. It is desirable to have a less expensive tube which can be discarded after a single use.

Rubber surgical tubes also have certain inherent disadvantages. For example, the tubes are opaque so that materials draining through the tube cannot be observed. The wall of the tube must be relatively thick so that the tube will not collapse. This makes the usable passage small for a given outside diameter. Rubber tubes are undesirably affected by lubricants and by chemicals, such as sulfides, present in certain body passages. The ingredients of the rubber tube may also irritate the delicate mucosa of body passages, producing secretions which tend to crust on the tube. These problems are particularly serious because the tubes are usually left in the body passage for a period of five to seven days.

Attempts to make plastic balloon catheters have not been successful because of the poor elasticity and resilience of the plastic. Attempts to provide plastic catheters with resilient rubber balloons have also been unsuccessful because of the difficulty of attaching the rubber balloon to the plastic catheter and because of rough edges at the ends of the balloon. Over-inflation, to be sure the tube is retained, aggravates the problem.

Other problems arise in providing the proximal end of a surgical tube with a suitable connector. Those now available are expensive to make and inconvenient to use. Resealing plugs provided in the inflation arm often leak. Moreover they require use of a hypodermic needle for inflation of the balloon, and the needle is apt to pierce the wall of the inflation arm rendering the tube useless and perhaps injuring the operator.

It is therefore an object of this invention to provide an inexpensive, surgical tube having a retention balloon.

A further object of the invention is to provide an improved surgical tube having an extruded plastic body and an inflatable rubber balloon.

A further object of the invention is to provide an effective method for attaching a rubber balloon to a double-lumen, plastic, surgical tube.

A further object is to provide a surgical tube having an improved connector at its proximal end.

A still further object of the invention is to provide a surgical tube having an improved, self-sealing plug in the inflation lumen.

The surgical tube of the present invention will be more fully understood from the description of the preferred form of the invention given with the accompanying drawings, in which.

Figure 8:
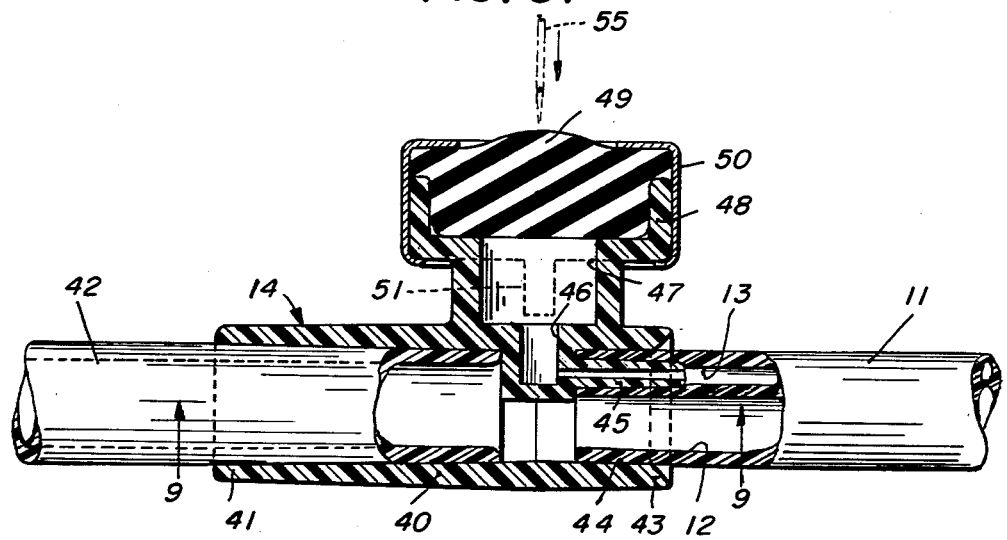
FIGURE 8 is a side elevation partly in section of the connector 14 and the tubes associated therewith.
Figure 9:
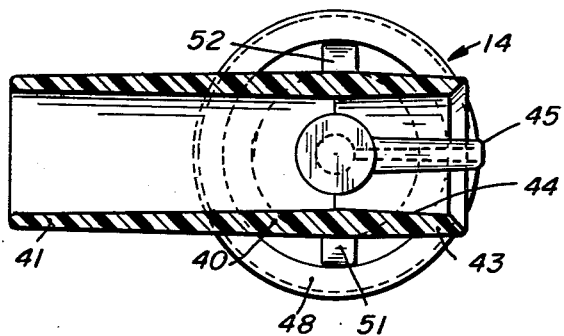

FIGURE 9 is a sectional view on the line 9—9 of FIGURE 8, showing the connector 14, without the tubes 11 and 42.

Referring now to the drawings, the surgical tube, generally indicated as 10, has an elongated tubular body 11. Body 11 is preferably made of a length of extruded plastic or rubber tubing. In most cases, plastic will be preferred for the reasons previously mentioned. Polyvinyl chloride is a particularly suitable material, but polyethylene, polyvinyl acetate, and other nontoxic, non-irritating, flexible thermoplastics may be used. If desired, from 20 to 50% barium sulfate can be incorporated in the polyvinyl chloride to increase the opacity of the tubing to X-rays.

The outer surface of tubular body 11 is cylindrical, while the inner surface defines a drainage channel 12 having a crescent-shaped cross section and a relatively small inflation channel 13 having a circular cross section. The proximal end of body 11 is provided with a connector 14. The distal end of body 11 is provided with a closed, rounded tip 15. A balloon 16 is attached to body 11 inwardly from tip 15. A radial passage 17 opens from inflation channel 13 into balloon 16. Drainage openings 18 and 19 are located between distal tip 15 and balloon 16 and communicate with drainage channel 12.

Figure 1:
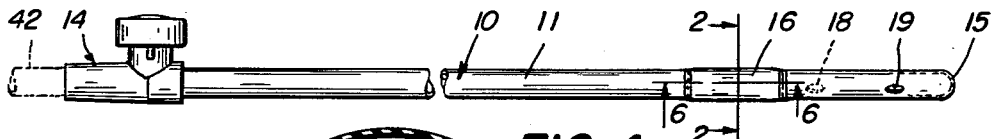
FIGURE 1 is an elevation of the invention.
Figure 2:
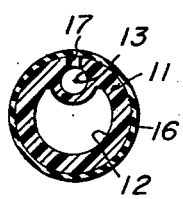
FIGURE 2 is an enlarged sectional view on the line 2—2 of FIGURE 1.
Figure 4:
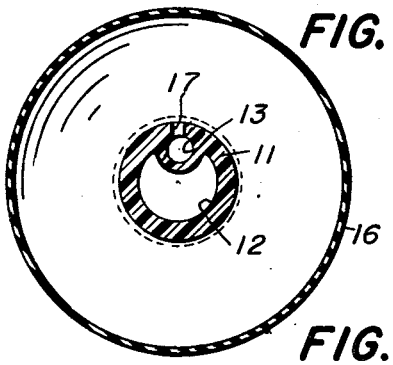
FIGURE 4 is an enlarged sectional view on the line 4—4 of FIGURE 3.
Figure 3:
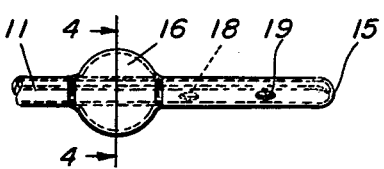
FIGURE 3 is an elevation of the distal end of the tube, showing the balloon 16 inflated.
Figure 5:
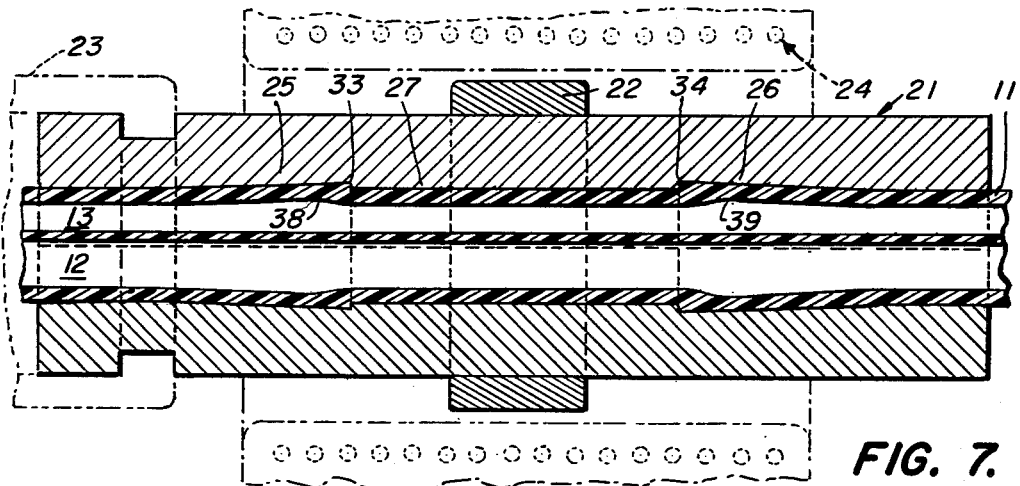
FIGURE 5 is an enlarged sectional view showing the manufacturing step of shaping the tube body 11.
Figure 6:
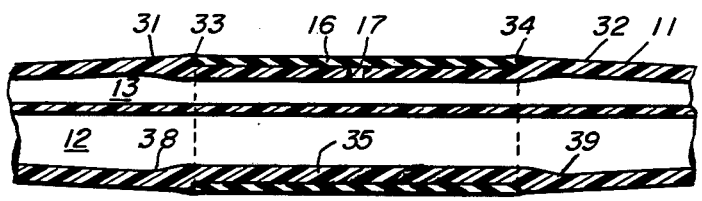
FIGURE 6 is an enlarged sectional view on the line 6—6 of FIGURE 1.

As shown in FIGURES 5 and 6, body 11 is shaped to receive the balloon 16. This is accomplished by placing a length of extruded tubing in a mold 21 and fastening the mold together with clamping ring 22. One end of channels 12 and 13 is then plugged and air pressure is applied to the opposite end. The mold is then placed by holder 23 in coil 24 of an induction heater. Electric current passing through coil 24 heats mold 21. The combination of heat and internal pressure causes body 11 to deform outwardly against the frusto-conical mold section 25, 26. Proper regulation of temperature and pressure assure adequate forming of body 11 without the formation of excessive flash. For example, temperatures above the softening point of the plastic, but below the melting point and air pressures of about 30 pounds gauge pressure may be used. The cylindrical mold section 27 supports the central portion of the tube and prevents distortion of the tube between mold section 25 and 26.

After shaping of body 11, drainage openings 18, 19 are punched and the distal end 15 molded to form a smooth, round, closed end.

Figure 7:
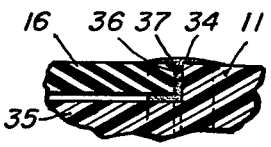
FIGURE 7 is an enlarged view of a portion of FIGURE 6, showing additional details.

As shown in FIGURES 6 and 7, the section of body 11 thus formed has a relatively uniform wall thickness. The wall of body 11 flares outwardly along the frusto-conical sections 31, 32 to form the shoulders 33, 34. The inner surface of body 11 also flares outwardly along the curved wall surface 38, 39. The cylindrical section 35 is located between shoulder 33, and shoulder 34 and preferably has the same diameter as the original extruded tubing.

Balloon 16 is attached concentrically around cylindrical section 35. The balloon is preferably formed of a length of surgical grade rubber tubing having a thickness of 0.010 to 0.020 inch. Such tubings are usually made by dipping forms in suitable solutions of compounded rubber latex and are of the type commonly known in the trade as "Penrose tubing." The inside diameter of the rubber tubing should be from 75 to 95% of the outside diameter of cylindrical section 35 so that the balloon is in a slightly stretched condition. If the tubing is too large, the ends of the balloon tend to flare outwardly. If the tubing is too small, the stress developed will accelerate deterioration of the thin balloon. For example, highly satisfactory tubes have been made from Penrose tubing having an inside diameter of 0.250 inch and a thickness of 0.015 inch and plastic tubes having an outside diameter of 0.300 inch.

The length of balloon 16 should be slightly less than the length of cylindrical section 35 so as to provide a small space between each shoulder 33, 34 and the adjacent end of balloon 16: For example, the balloon may be approximately 1/16 inch shorter than cylindrical section 35 so that 1/32 inch space is left on each end.

To attach balloon 16, it is first positioned around cylindrical section 35. The ends of the balloon 16 are then rolled back and a very thin layer 36 of adhesive is applied around each end of cylindrical section 35. The ends of balloon 16 are then unrolled and pressed into adhesive layer 36. This pressure displaces a portion of the adhesive into the spaces between the respective ends of the balloon 16 and the radial surface of shoulders 33 and 34.

The adhesive selected for layer 36 must form a strong permanent bond between the rubber and vinyl materials. It should have particularly high tensile strength, be relatively resistant to deterioration by moisture, and be without deteriorating effect on plastic body 11 or balloon 16. The cyanoacrylate type of adhesives described in U.S. Patent 2,794,788, issued June 4, 1957, are particularly suitable.

An annular band 37 of a second adhesive material is placed over the outer surface of shoulders 33, 34, the respective ends of balloon 16 and the spaces between the shoulders and the balloon ends. The second adhesive material should be fairly flexible, nontoxic, nonirritating to the linings of delicate body passages, and free from deleterious effects on plastic body 11 or rubber balloon 16. Sufficient adhesive should be used to fill any void between the respective ends of balloon 16 and shoulders 33, 34 and to provide a smooth surface over the juncture of said ends with the shoulders.

Connector 14 has a tubular body 40 molded of rigid polyvinyl chloride or similar plastic material. The proximal end 41 of body 40 is adapted to receive an extension tube 42. The other end 43 of body 40 has a tapered lead-in section 44 and is adapted to receive the proximal end of body 11. A small, tapered tube 45 extends outwardly beyond lead-in section 44 and is adapted to fit snugly within the inflation channel 13. A passage 46 connects tube 45 to reservoir 47. Above reservoir 47 the walls of connector 14 flare outwardly to form a cup 48. A rubber plug 49, slightly larger than cup 48, is deformed radially inwardly by the walls of cup 48 and is held in said cup by retaining ring 50. On the outer surface, the walls or reservoir 47 are provided with flanges 51, 52 on which ejector pins impinge to drive the part out of its mold.

In use, the distal end of my surgical tube is first inserted through the appropriate body passage. A hypodermic needle 55 attached to a syringe (not shown) is then inserted through rubber plug 49 into reservoir 47 and the desired amount of liquid injected to inflate balloon 16. The rigid walls of reservoir 46 prevent needle 55 from damaging the tube or injuring the operator. After inflation, needle 55 is withdrawn, and rubber plug 99 reseals. Extension tube 42 is then inserted in the open end 41 of connector 14 and drainage commenced. Since the wall thickness of body 11 is relatively uniform, the drainage channel 13 under ballon 16 is not collapsed or restricted thus allowing fluid, clots, and mucous to pass freely through channel 12. Shoulders 33, 34 and adhesive 36 block any tendency of balloon 16 to slide longitudinally along body 11.

To remove the surgical tube, rubber disc 49 is again pierced with needle 55 and the fluid withdrawn from reservoir 47, thus deflating balloon 16. Because of its elasticity, balloon 16 contracts tightly around tube section 35 and the surgical tube may be easily withdrawn.

While I have described the preferred form of the invention, it should be understood that those skilled in the art may make various changes in its construction without departing from the spirit of the invention.

I claim:

1. A surgical tube comprising: an elongated, tubular body of flexible, extruded plastic; a drainage channel and an inflation channel defined by the walls of said body; a tapered, frusto-conical section flaring outwardly toward one end of the body; a second frusto-conical section between said first section and the end of the body, said second section flaring outwardly away from the end of the body; a relatively short cylindrical section between the two frusto-conical sections, the diameter and wall thickness of said cylindrical sections being substantially the same as that of the major portion of the body; an annular shoulder at each end of the cylindrical section projecting radially outward to meet the base of the respective frusto-conical section; and a thin, resilient, cylindrical, elastic balloon telescoped over said cylindrical section.

2. A surgical tube comprising: an elongated cylindrical body having a crescent-shaped drainage channel and a cylindrical inflation channel; a rigid connector on one end of said body; a cylindrical portion on said connector telescoped over one end of the body and attached thereto; a relatively small, substantially cylindrical tube within the cylindrical portion and parallel thereto, telescoping into the inflation channel; a lateral extension of the connector defining a reservoir connected to said tube; an enlarged, cup-shaped connector section projecting from said extension; and a rubber plug in the cup-shaped section, said plug being deformed radially inward by the walls of said section.

3. A surgical tube comprising: an elongated, tubular body, the major portion of which has a uniform cylindrical outer surface, said body having a proximal end, a distal end, a drainage channel and an inflation channel; a cylindrical section near the distal end of said body, said section having an outside diameter and a wall thickness substantially equal to those of the major portion of the tubular body; an outwardly projecting, annular shoulder at each end of the cylindrical section; tapered body sections flaring outwardly from the uniform cylindrical outer surface to each of said shoulders; and a resilient, elastic balloon telescoped over said cylindrical section, said balloon in its unstretched condition having an inside diameter of from 75 to 95% of the outside diameter of the cylindrical section.

4. A surgical tube as set forth in claim 3 wherein a portion of the body forming the drainage channel flares outwardly adjacent the annular shoulders to provide an enlarged drainage channel section and to maintain a relatively uniform thickness throughout the body wall.

5. A surgical tube as set forth in claim 3 wherein the drainage and inflation channels extend from the proximal end of the body to the distal end; and the distal end of the body has a closed rounded tip, portions of which seal the distal ends of the drainage and inflation channels.

6. A surgical tube as set forth in claim 3 wherein the balloon is formed of a length of thin-walled rubber tubing having a substantially uniform thickness and diameter, and a length less than the length of the cylindrical section, the inner surface of said balloon when uninflated fitting tightly around the cylindrical body section in contact therewith; an annular space at each end of the cylindrical section, said space being defined by a portion of the cylindrical section, the adjacent balloon end, and the adjacent shoulder; and an adhesive filling said space.

7. A surgical tube as set forth in claim 6 wherein a first adhesive attaches the balloon to each end of the cylindrical surface and to the radial surface of the shoulder and a second adhesive covers the outer surface of each balloon end, the end of each tapered section and the space between each balloon end and the adjacent tapered section.

8. A surgical tube comprising: an elongated cylindrical body having a drainage channel and an inflation channel; a rigid connector on one end of said body; a portion of said connector telescoped with one end of the body and attached thereto; a relatively small, substantially cylindrical tube within said connector portion telescoping into the inflation channel; a lateral extension of the connector defining a reservoir communicating with said tube; an enlarged, cup-shaped connector section projecting from said extension; and a rubber plug in the cup-shaped section.

9. A connector for a flexible, surgical tube having an inflation channel and being capable of being punctured by a hypodermic needle comprising: a body having walls sufficiently rigid to resist puncture by the point of a hypodermic needle; a portion on said body adapted to receive one end of a surgical tube; a relatively small tube adapted to telescope into the inflation channel of a surgical tube; a reservoir, open on one outer side and defined and surrounded on the other sides by the rigid body walls; passage means in one of the rigid walls connecting the reservoir with the small tube; and a self-sealing plug capable of being punctured by a hypodermic needle closing the open side of the reservoir.

10. A surgical tube comprising: an elongated, soft, flexible, tubular body capable of being inserted in a delicate body passage and having a drainage channel and an inflation channel, said tubular body being easily puncturable by the point of a hypodermic needle; a separately formed connector firmly attached to one end of said body, and having walls formed of a hard rigid plastic material which cannot be punctured by the point of a hypodermic needle; a reservoir, open on one side and defined and surrounded on the other sides by the rigid, puncture-proof walls of the connector; a passage defined by one of the connector walls and connecting the reservoir with the inflation channel; and a self-sealing plug capable of being punctured by a hypodermic needle closing the open side of the reservoir.

11. A surgical tube as set forth in claim 10 wherein the walls forming the open side of the reservoir are cup-shaped; the plug is formed of a self-sealing, deformable, rubber material and has an outer diameter larger than the inside diameter of the rigid, cup-shaped walls, whereby said plug is deformed radially inwardly by said walls.

12. A surgical tube comprising: an elongated, flexible, tubular body, capable of being punctured by a hypodermic needle and having a drainage and an inflation channel; a separately formed connector firmly attached to one end of said body, and having walls sufficiently rigid to resist puncture by the point of a hypodermic needle; a reservoir, open on one side and defined and surrounded on the other sides by the rigid, puncture-resistant walls of the connector; a passage defined by one of the connector walls and connecting the reservoir with the inflation channel; a self-sealing plug capable of being punctured by a hypodermic needle closing the open side of the reservoir; and a tapered tube projecting longitudinally from the connector and telescoping into the inflation channel connecting it with the reservoir.

References Cited in the file of this patent

UNITED STATES PATENTS

| | | |
|---|---|---|
| 2,043,630 | Raiche | June 9, 1936 |
| 2,173,527 | Agayoff | Sept. 19, 1939 |
| 2,298,101 | Beal | Oct. 6, 1942 |
| 2,322,858 | Limbert et al. | June 29, 1943 |
| 2,547,758 | Keeling | Apr. 3, 1951 |
| 2,561,569 | Flynn | July 24, 1951 |
| 2,642,874 | Keeling | June 23, 1953 |
| 2,647,515 | Pollock et al. | Aug. 4, 1953 |
| 2,819,718 | Goldman | Jan. 14, 1958 |
| 2,862,497 | Pagano | Dec. 2, 1958 |
| 2,886,035 | Loutz | May 12, 1959 |
| 2,896,629 | Warr | July 28, 1959 |
| 2,912,981 | Keough | Nov. 17, 1959 |